Nov. 20, 1923.
1,474,822
G. F. HAUF
PIPE AND PIPE CLAMP
Filed Nov. 6, 1920
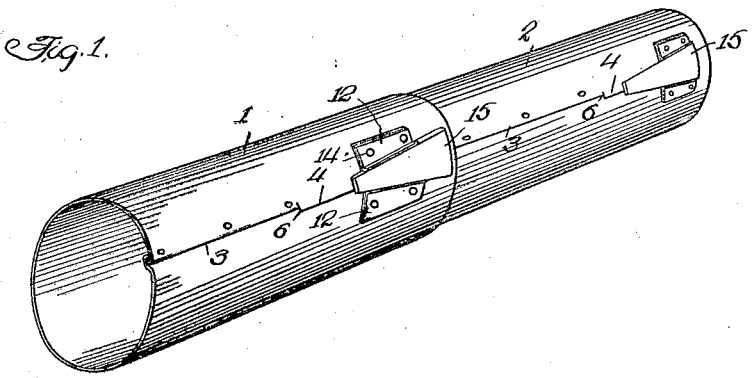
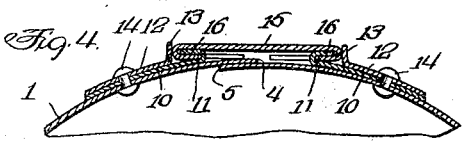 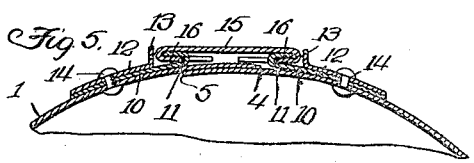
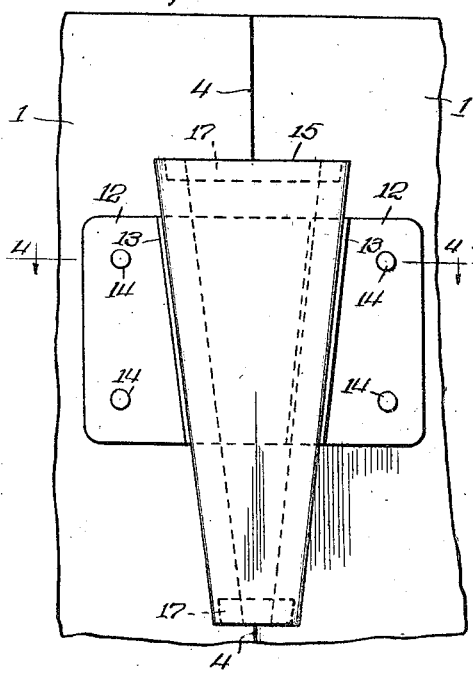 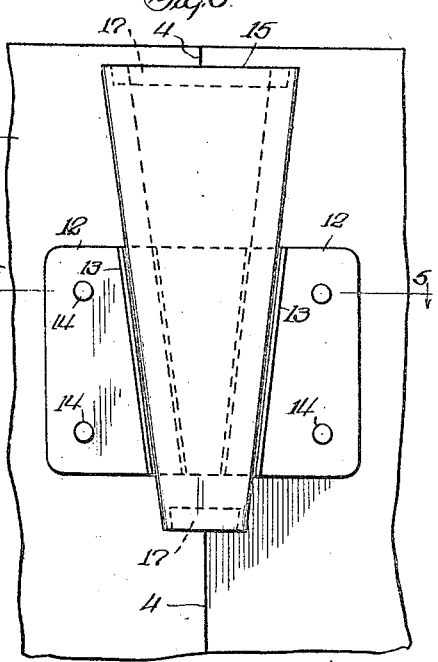
Inventor:
George F. Hauf Patented Nov. 20, 1923.

1,474,822

UNITED STATES PATENT OFFICE.

GEORGE F. HAUF, OF CHICAGO, ILLINOIS, ASSIGNOR TO ROBERTSON BROTHERS MANUFACTURING COMPANY, A CORPORATION OF ILLINOIS.

PIPE AND PIPE CLAMP.

Application filed November 6, 1920. Serial No. 422,204.

*To all whom it may concern:*

Be it known that I, GEORGE F. HAUF, a citizen of the United States, residing at Chicago, in the county of Cook and State of Illinois, have invented certain new and useful Improvements in Pipes and Pipe Clamps, of which the following is a specification.

This invention relates to pipes and pipe clamps.

Metal pipes, especially those of a temporary character, ordinarily heretofore have been constructed of separate lengths or sections secured together by flanges or clamps which necessitate the use of screws or nuts and bolts.

Such construction is objectionable because the screws, nuts and bolts become rusty in a short time and are then difficult to operate. Moreover it takes considerable time to tighten and loosen screws, nuts and bolts. The length of the pipe is dependent upon the lengths of the sections and, in order to exactly obtain the proper length, it has heretofore been necessary to have several different lengths of sections and even then it is sometimes necessary to cut the pipe to obtain the necessary overall length.

One of the objects of this invention is to provide an improved sheet metal pipe which may be readily erected and taken down.

Another object is to provide a clamp without screws, nuts or bolts.

Another object is to provide a clamp whereby lengths or sections of pipe may be united and separated by the use of a hammer or any pounding implement.

Another object is to provide a clamp which forces the expansion of one of the sections of pipe to facilitate separation of adjacent sections.

Another object is to provide pipe sections whereby the overall length of the pipe is not wholly dependent upon the length of the sections employed.

Other objects and advantages will hereinafter appear.

An embodiment of the invention is illustrated in the accompanying drawing, wherein—

Fig. 1 is a perspective of a two-section length of pipe.

Fig. 2 is an enlarged top plan of a clamp in expanded position.

Fig. 3 is an enlarged top plan of a clamp in clamping or gripping position.

Fig. 4 is a section on the line 4—4 of Fig. 2, and

Fig. 5 is a section on the line 5—5 of Fig. 3.

Fig. 1 shows a pipe composed of two similar sheet iron lengths or sections 1 and 2. Each length or section is made of a sheet of metal bent into substantially cylindrical form.

The edges of the sheet are joined together with a permanent seam 3 throughout the greater portion of the length of the section. This seam may be made in any suitable manner to give a permanent joint and lend rigidity to that end of the section. Ordinarily such seams are made by folding the edges together and riveting or welding the folds together at intervals.

The other end or section of the length or section of pipe is made flexible for some distance. This flexibility is provided by simply overlapping the two longitudinally extending edges 4 and 5 of the sheet and not rigidly joining them together.

The desired overlapping of the edges may be obtained by providing a small, circumferential cut 6 in each edge at the point of the junction of a rigid and flexible section of the pipe length or section. The edges on only one side of these cuts are folded together into a permanent joint, causing the edges on the other sides of the cuts to overlap a distance represented by the amount of metal required for the folded permanent joint.

Thus one section of a pipe length may be contracted and expanded to decrease and increase the diameter while the other section thereof is substantially rigid at a permanent diameter.

A pipe of the desired overall length may be provided by telescoping the rigid and flexible ends of the required number of sections.

In order to contract the flexible end of a section to cause the same to grip the rigid end of an adjacent section and to expand the flexible end to facilitate the separation of the sections, a double acting wedge-clamp is provided.

This clamp may be made to perform its double function merely by the use of a hammer or any other implement suitable for pounding.

The clamp comprises a pair of double acting, clamping members and a double acting wedge.

The clamping members are composed of a pair of metal strips or plates 10, whose inner edges are bent over to form a pair of similar lips 11. These lips diverge from each other in the direction of the flexible end of the section forming a wedge-shaped internal guideway.

A wedge-shaped external guideway is provided by two similar metal strips or plates 12, whose inner edges are bent upwardly into flanges 13. Flanges 13 also diverge from each other in the direction of a flexible end of the section.

Plates 10 and 12 are secured together in pairs to form the clamping members. Each pair is secured to one of the flap-like portions of the flexible part of the section near the end. Any suitable means, such as rivets 14, may be used to secure the plates of a pair together and to the pipe adjacent the respective edge.

A double acting wedge 15 is provided to co-operate with the clamping members to contract and expand the flexible end of the section.

This wedge may be formed from a wedge-shaped piece of metal by bending the opposite diverging edges thereof into a pair of diverging lips 16. Lips 16 of wedge 15 are adapted to fit within the diverging internal guideway formed by lips 11 and co-operate with the diverging surfaces thereof to draw the clamping members closer together to increase the overlap and thus contract the flexible end of the section. When the wedge is thus positioned the external diverging edges or surfaces thereof may co-operate with the diverging flanges 13 to force the clamping members apart to decrease the overlap and thus expand the flexible end of the section.

The edge at the larger end of wedge 15 may be bent inwardly before the wedge is positioned. The edge of the smaller end of the wedge is left straight until the wedge is slipped into place, when it may also be bent inwardly. The bent-over edges of the ends of the wedge provide larger and stronger surfaces for hammering the wedge forth and back into contracting and expanding position and, by engaging the ends of plate 10, prevent the wedge from being driven off the pipe.

The methods by which pipes may be assembled and taken apart are as follows:—

With the wedge driven into expanding position, as shown in Fig. 2, the flexible end of a section is telescoped over the rigid end of an adjacent section.

Then the wedge is driven in the opposite direction (upwardly as viewed in Fig. 2) until the two sections are sufficiently clamped together. The clamping action is produced by the wedging co-operation of the diverging guideway formed by lips 11 on the flexible flaps of the section and the diverging lips 16 of wedge 15. This wedging action increases the overlap of the edges of the section and consequently decreases the diameter of the flexible end of the section, causing the same to grip or clamp the rigid end of the adjacent section. The harder the wedge is pounded home the tighter will be the clamping action.

Any number of sections may be thus clamped together. The overall length of the completed pipe may also be governed and readily changed by varying the amount or depth of the telescope. A very slight telescope is sufficient to provide a good joint between adjacent sections. While if a slightly shorter pipe is desired, the same may be produced by increasing the amount or depth of the telescope.

To take down the pipe or separate the sections the wedge is driven in the opposite direction or downwardly as viewed in Figs. 2 and 3. When the wedge is thus driven, the diverging outer edges thereof co-operate with the diverging flanges 13 on the flaps of the flexible end of the section. The wedging action thus produced is in the opposite direction, decreasing the amount of overlap and consequently increasing the diameter of the flexible end of the section. The clamping action between adjacent sections is thus positively released and the section may be readily separated.

The sections may be readily clamped and unclamped by the use of any available hammering implement, such as a hammer, bar of iron, or even a stone. The telescope, and consequently the overall length of the completed pipe, may be readily and quickly increased or decreased. The positive unclamping action of the clamp insures against the sticking together of the sections and insures that the pipe can be taken down when desired.

To strengthen the wedge and prevent the ends thereof from being battered by hammering, small metal blocks 17 may be welded, or otherwise secured therein, adjacent the ends.

The clamping and wedging members may, of course, assume various other forms and may be made in different sizes and the cross section of the pipe may assume other shapes than circular.

Having described my invention what I claim as new and desire to secure by Letters Patent is:—

1. A pipe having a section with overlapping longitudinal edges, and a double wedge clamp operable longitudinally of the section to increase and decrease the amount of the overlap to contract and expand the section.

2. A pipe having a flexible section whose adjacent edges may be moved relative to each other to effect contraction and expansion, and a double wedge clamp operable in opposite directions to contract the section and expand the section.

3. A pipe having a flexible section whose adjacent edges may be moved relative to each other to effect contraction and expansion of the section, clamping members associated with each adjacent edge of the section, and a double wedge operable longitudinally of the pipe and cooperating with said members to force the expansion and contraction of the flexible section.

4. A pipe having a section with unconnected longitudinal overlapping edges; and a clamp for contracting and expanding the section by increasing and decreasing the overlap, said clamp comprising a double acting clamping member attached near each overlapping edge, and a double acting wedge axially movable of the section and co-operating with the two clamping members to draw the same closer together or force the same further apart.

5. A pipe having a rigid section, and a flexible section with overlapping longitudinal edges; and a clamp adjacent the end of the flexible section, said clamp comprising a double acting clamping member attached near each overlapping edge, and a double acting wedge co-operating with the two clamping members and movable in one direction to draw the same closer together to increase the overlap and contract the flexible section and movable in another direction to force the clamping members further apart to decrease the overlap and expand the flexible section.

6. A pipe having a rigid section, and a flexible section with longitudinally extending overlapping edges; and a clamp adjacent the end of the flexible section, said clamp comprising a double acting clamping member attached near each overlapping edge, and a movable double acting wedge locked to the two clamping members and co-operating therewith to draw the members closer together to contract the flexible section or force the members further apart to expand the flexible section depending upon the direction the wedge is moved.

7. A pipe having a flexible section with longitudinally extending overlapping edges, an external and internal clamping member secured adjacent each overlapping edge, and a longitudinally movable wedge having internal and external wedging surfaces co-operating with said members to draw the members closer together to contract the flexible section when the wedge is moved in one direction and to force the members further apart to expand the flexible section when the wedge is moved in the opposite direction.

8. A pipe having a rigid section, and a flexible section with overlapping longitudinally extending edges, a clamping member secured adjacent each overlapping edge, each said member having a flange and a lip diverging from a plane through the axis of the pipe, and a wedge having an external edge co-operating with each of the flanges of the clamping members and a lip co-operating with each of the lips of the clamping members, the edges, flanges and lips coacting to draw the clamping members closer together and contract the flexible section by increasing the overlap and forcing the clamping members further apart and expand the flexible section by decreasing the overlap.

9. A pipe having a flexible section with overlapping longitudinally extending edges, a clamping member secured adjacent each overlapping edge, each said member having two wedging surfaces, and a wedge having two pairs of wedging surfaces, each pair cooperating with the wedging of one of the clamping members, said wedge acting alternatively to draw the clamping members closer together to contract the flexible section and to force the clamping members apart to expand the flexible section.

10. A pipe clamp comprising a pair of double acting clamping members, and a wedge co-operating with the clamping members to alternately draw the same together and force the same apart.

11. A pipe clamp comprising a pair of double acting clamping members, and a double acting wedge longitudinally movable thereof and co-operating therewith to alternately draw the clamping members together or force the same apart when the wedge is moved in opposite directions.

In testimony whereof I hereunto subscribed my name.

GEORGE F. HAUF.